Aug. 19, 1969    C. E. NAPPLE    3,461,539
METHOD OF CONNECTING A FIBERGLASS RODLIKE MEMBER TO
A METALLIC TERMINAL
Filed Sept. 26, 1966
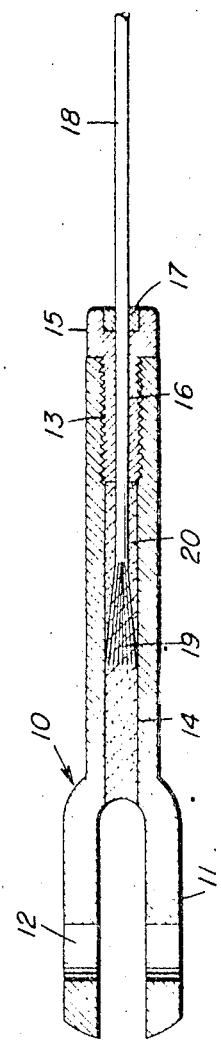
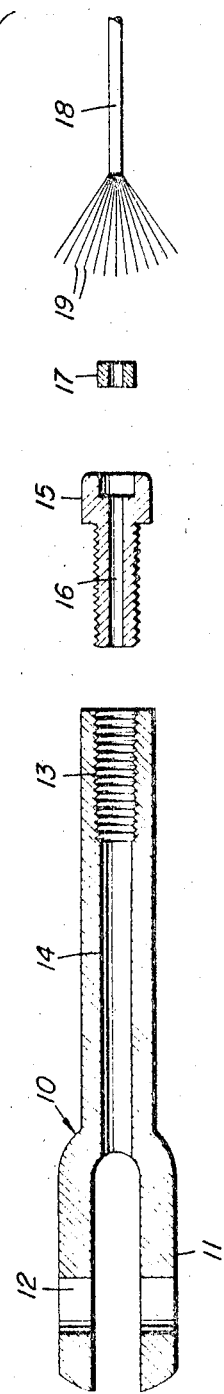
INVENTOR
Charles E. Napple
BY
ATTORNEY
AGENT 3,461,539
METHOD OF CONNECTING A FIBERGLASS ROD-LIKE MEMBER TO A METALLIC TERMINAL
Charles E. Napple, Rockville, Md., assignor to the United States of America as represented by the Secretary of the Navy
Filed Sept. 26, 1966, Ser. No. 582,476
Int. Cl. H02g 15/22; B23p 19/00
U.S. Cl. 29—461     3 Claims

ABSTRACT OF THE DISCLOSURE

A method of connecting a fiberglass rod type structural member and a metallic end terminal having a longitudinal bore therethrough by inserting one end of the rod through the bore, fraying the end of the rod, coating both the bore interior and the frayed end of the rod with a bonding agent, and positioning the frayed end of the rod within the terminal bore.

---

The invention described herein may be manufactured and used by or for the Government of the United States of America for governmental purposes without the payment of any royalties thereon or therefor.

This invention relates to a method for securing terminal fittings to non-metallic inorganic rod type structural members.

More particularly the invention relates to an improved method for securing attachment type end terminals, such for example as threaded studs, clevis devices, yokes, ball members for ball and socket connection and the like, to fiberglass rod type structural members of a character adapted to provide an improved juncture capable of withstanding tensionally applied loading during use thereof.

Prior attachment methods for the securing of rod members to terminal fittings of the aforementioned character have included the use of clamps of a mechanical nature and techniques of cementing. In the prior art practices utilizing a cement for attachment of the parts thereof, the outer periphery and/or end of the plastic type rod generally is coated with an adhesive of one kind or another, then inserted into a sleeve like portion of the terminal end fitting which may also be coated with adhesive if desired and thereafter the cement is cured or allowed to set until the bond is firm. An example of a terminal connection for use with an organic type tension member is shown in U.S. Patent 3,264,017 which issued to R. H. Lagarde on Aug. 2, 1966.

Termination connections of the prior art types have met with success for a variety of applications. In certain applications however, when the demands of an apparatus for a particular type of service use require that the structural load bearing rod be fiberglass and possess the ability to withstand high order applications of a tensional force, it has been found that the fiberglass rod does withstand the demands of use, but that the bond of the joint of the terminal fitting does not withstand the effects of tension stresses and axially applied loads. The failure of certain types of prior joints or bonds may in part result from the limitations existent due to the available area of cement coated fiberglass disposed along the periphery of the rod and in contact with the terminal fitting, and hence the area available for effective bonding purposes may result in undesirably long extensions on the terminal fittings in order to attempt to provide an optimum contact area between the fiberglass rod and the terminal fitting. In certain applications wherein space limitations of the structure associated with the fiberglass rod and terminal fitting are such that long terminal fiberglass contact areas are unsuitable, the loadings which may be applied to such shorter joints must necessarily be considerably reduced.

It is a feature of the instant invention to provide an improved technique for attachment of terminal fittings to fiberglass rod type tension members wherein a greater area of contact is provided between the fiberglass surfaces and an epoxy material utilized for purposes of providing a bond between the fiberglass and metallic surfaces respectively, of a fiberglass rod and a metallic terminal fitting.

One object of the instant invention resides in the provision of an improved method of fabricating a terminal end junction between a metallic terminal fitting and a fiberglass rod wherein the end terminal portion of the fiberglass rod is frayed in order to present the entire surface of each fiber, for a predetermined length thereof, to contact with an epoxy or suitable cement used for the frayed juncture.

Another object is to provide an improved method of forming a fiberglass rod-to-metallic terminal juncture which is of a character occupying a minimum of space while providing improved characteristics of a nature rendering the structural member incorporating the joint adaptable to tension loading and in providing all of the advantages of structures heretofor or now in general use for attaining substantially all of the advantages thereof while obviating the disadvantages thereof as to bulk and inadequate strength.

Other objects and many of the attendant advantages of this invention will become apparent as the description proceeds wherein reference is made, for purposes of illustration, to the accompanying drawing wherein:

FIG. 1 is a sectional view in elevation illustrating a typical joint between a fiberglass rod and a metallic end terminal in accordance with the improved techniques of the instant invention, and FIG. 2 is an exploded view in section showing the various elements utilized in the practice of the instant method, in a disassociated condition prior to assembly.

Referring now to the drawings wherein a metallic end fitting is indicated generally at 10 and for purposes of illustration is shown as a clevis type terminal having a bifurcated projection indicated at 11 which is provided with a transverse bore indicated at 12, for reception of a clevis pin, not shown, when the terminal end is attached to associated structure, such for example, as an eye bolt member or the like.

At the opposite end portion of the clevis which is of a commercially available type such for example as may be utilized with one end of a rod assembly provided with a turn buckle shaft or the like, the female threaded portion 13 terminates in a drilled bore 14 which is well adapted for reception of the fiberglass rod 18. An intermediate element such for example as a conventional socket head cap screw 15 is provided with a longitudinal bore 16, provided as for example by drilling therethrough. The aforementioned fiberglass rod 18 in the assembly relationship as shown in FIG. 1 is sealed at the outer end by a rubber grommet or sleeve 17 which is received in the threaded portion of the socket portion of the socket head cap screw 15.

In the practice of the method of the instant invention the end portion of the fiberglass rod 18 is frayed back to expose the individual fiber elements 19 of which the rod is composed. The rod is preferably inserted through the grommet 17 and the cap screw 15 to a point wherein the portion projects beyond the outer end of the drilled bore 16 of the cap screw 15 and prior to fraying out of the portion 19. The portion 19 of the fiberglass rod 18 and the interior portion at 14 of the terminal member 10 are coated with epoxy as indicated at 20 in FIG. 1. Thereafter the rod end and terminal assembly is mated with the cap screw 15 and grommet 17 by screwing the parts together.

In view of the foregoing a preferred method of the instant invention is accomplished by inserting the end of the fiberglass rod through grommet 17, capscrew 15 and completely through terminal 10, fraying the rod end as shown at 19 and coating the portion 19 with epoxy of a suitable character, such for example as that known in the trade as Ciba Epoxy 6005, and partially withdrawing the assembly. The rubber grommet or sleeve 17 and internally drilled capscrew 15 are disengaged from terminal 10 at this time. The void at 14 in terminal 10 is also filled with the same epoxy. This may, if desired be accomplished at this time, or in the alternative the bore may have been precoated, in which instance the epoxy carried by the fiberglass rod portion 19 may be sufficient to completely fill the void in the bore 14. The capscrew and grommet assembly is then screwed into the threaded portion 13 of terminal 10.

In an alternative assembly procedure the rod end 19 may be prefrayed either before or preferably after the capscrew and grommet assembly are installed thereon. Obviously the capscrew and grommet may be assembled from the opposite end of the fiberglass rod. However when the tension rod is of considerable length this is an inconvenient procedure.

The frayed portion 19 may now be coated with epoxy and inserted into the bore at 13. The bore portion 14 of terminal 10 may be filled with epoxy at this time or just prior to the insertion of portion 19 of fiberglass rod 18. In either instance portion 19 is inserted into bore portion 14, whereupon capscrew 15 is screwed into the threaded portion 13 of terminal 10. The assembly is allowed to set before being placed in use.

Obviously many modifications and variations of the present invention are possible in the light of the above teachings. It is therefore to be understood that within the scope of the appended claims the invention may be practiced otherwise than as specifically described.

What is claimed is:

1. The method of providing a connection between a fiberglass rod type structural member composed of individual fiber elements and a metallic end terminal having a longitudinal bore therethrough which comprises the steps of:
   coating the interior bore of said terminal with an epoxy resin type bonding agent,
   inserting the terminal end of said rod through a capscrew like sleeve of a character adapted to matingly engage a similarly threaded portion of the metallic terminal, and through the terminal,
   fraying a predetermined portion of the terminal end portion of said rod type member to expose and separate the individual fiber elements,
   coating the fiber elements of said frayed portion of said rod with an excess of the same epoxy resin type bonding agent,
   drawing said coated fibers of said frayed portion into said terminal,
   screwing said capscrew like sleeve into said terminal and permitting said epoxy to set.

2. The method of providing a connection between a fiberglass rod type structural member composed of individual fiber elements and a metallic end terminal of a character having a longitudinal bore therethrough which comprises the steps of;
   inserting the terminal end of said rod type member through the bore in a threaded capscrew like sleeve of a character adapted to threadedly engage a threaded portion of the longitudinal bore of the metallic end terminal,
   fraying a predetermined portion of the terminal end portion of said rod to expose and separate the individual fiber elements,
   coating the interior bore of said terminal with an epoxy resin type bonding agent,
   coating the fiber elements of the frayed end portion of said rod with the same epoxy resin type bonding agent,
   inserting said frayed portion of said rod into the bore of said terminal,
   tightening said sleeve into said terminal and
   permitting said epoxy to set.

3. The method of claim 2 further including the step of positioning a rubber like grommet into a bore therefor in said capscrew like sleeve member.

References Cited

UNITED STATES PATENTS

| 974,719 | 11/1910 | Stevenson. | |
|---|---|---|---|
| 3,195,939 | 7/1965 | Lagarde et al. | 287—82 |
| 812,412 | 2/1906 | Downs et al. | 24—123.2 |
| 3,264,017 | 8/1966 | Lagarde | 24—123.2 X |
| 3,283,380 | 11/1966 | Gassner | 24—123.2 |

JOHN F. CAMPBELL, Primary Examiner

D. C. REILEY, Assistant Examiner

U.S. Cl. X.R.

24—123.2; 29—629; 287—82